Sept. 26, 1961 R. MONTGOMERY 3,001,740
AEROPLANE WITH VERTICAL LIFT ENGINE INTAKE STRUCTURE
Filed June 9, 1960 2 Sheets-Sheet 2
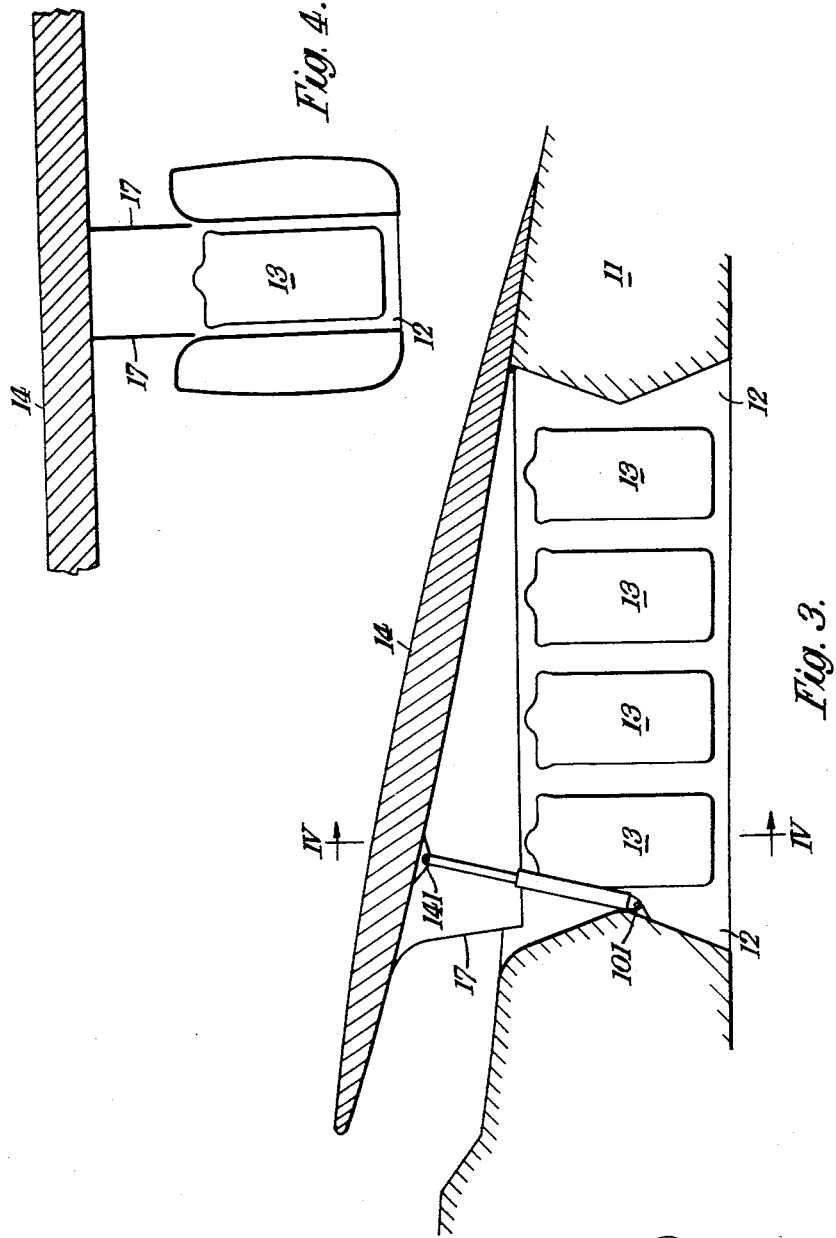

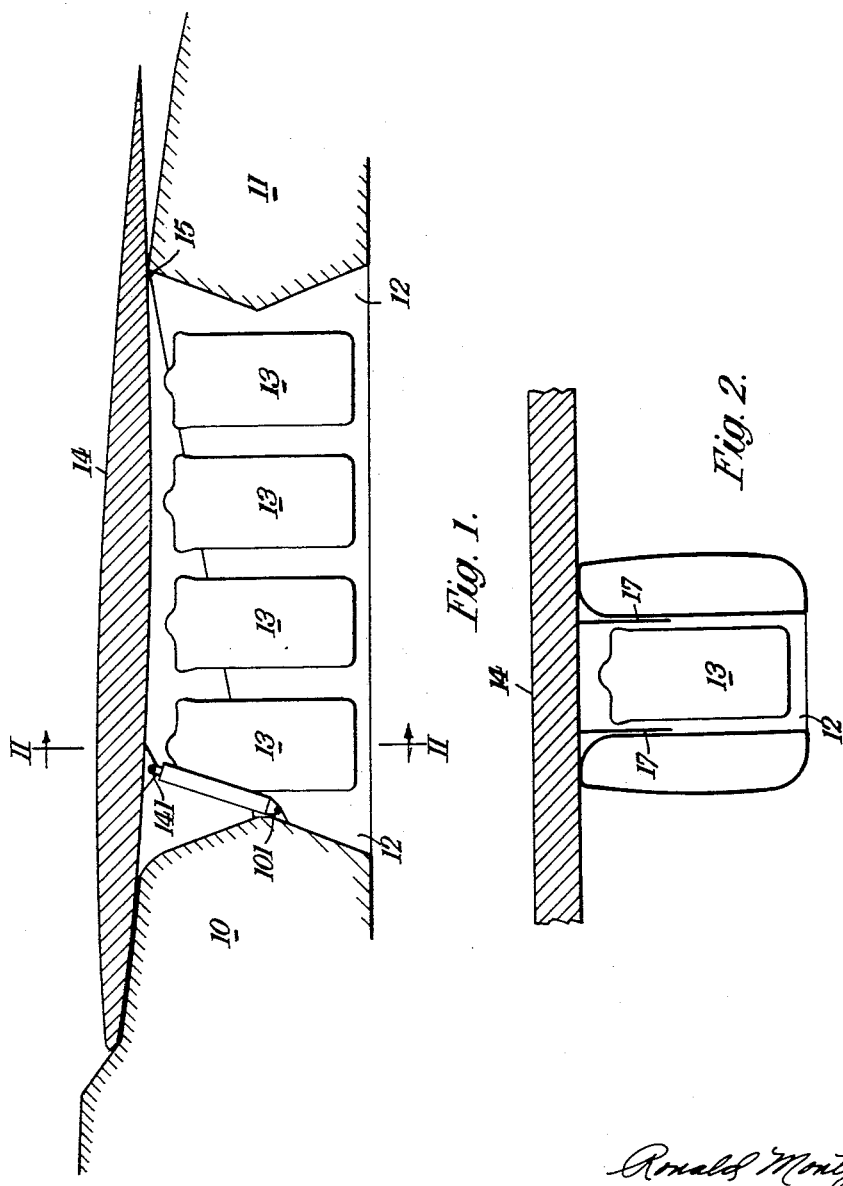

United States Patent Office 3,001,740
Patented Sept. 26, 1961

3,001,740
AEROPLANE WITH VERTICAL LIFT ENGINE INTAKE STRUCTURE
Ronald Montgomery, Belfast, Northern Ireland, assignor to Short Brothers & Harland Limited, Belfast, Northern Ireland, a British company
Filed June 9, 1960, Ser. No. 35,010
Claims priority, application Great Britain June 23, 1959
3 Claims. (Cl. 244—12)

The invention is concerned with aeroplanes incorporating in the fuselage or body one or more jet engines disposed vertically so that the propulsive thrust thereof may be utilised for take-off and landing operations. In such aircraft it is necessary to provide an air intake large enough to admit the necessary air for running in the static condition for vertical take-off without causing undue pressure loss across the engine face. It is also necessary for this intake to be adjustable so that, in forward flight, sufficient ram air is admitted to the vertical lift engines for starting purposes and so that when wing-borne flight is undertaken, the intake can be completely closed and its drag eliminated.

The foregoing requirements are achieved by this invention in an aeroplane designed for flight at very high speeds, in which the wing system is capable of adjustment with respect to incidence in relation to the body or fuselage, by utilising the wing structure itself as a closure for the air-intake of the vertical lift engine installation, the arrangement being such that the said air-intake is open when thrust is required from the lift engines, i.e. at take-off and landing and during flight at low subsonic speeds, but is closed automatically by the alteration of the wing system to the low incidence setting for high speed flight.

In the low speed condition a part of the wing structure may be arranged to serve as a scoop for diverting the airstream into the engine installation air-intake.

The manner in which the invention may be carried into effect is hereinafter more fully described with reference to the accompanying diagrammatic drawings which illustrate an application of the invention to a high-wing aircraft.

In the drawings:
FIG. 1 is a partially sectional side elevation of the lift engine bay and
FIG. 2 is a transverse section taken on the line II—II of FIG. 1. In these figures the wing is shown in the high-speed condition.

The low-speed condition of the wing is shown in FIGS. 3 and 4, which are respectively similar to FIGS. 1 and 2.

In the drawings, the reference numerals 10 and 11 designate fore and aft parts of the fuselage structure, between which is located the bay 12 containing a battery of vertical jet engines 13, 13 etc., the downwardly directed efflux which is employed to provide upward lift for assisting take-off and landing operations. Situated above said engine-bay 12 is a wing system including the aerofoil 14, which is pivoted to the fuselage structure about a transverse hinge axis 15, so as to be capable of being moved between a high incidence condition shown in FIGS. 3 and 4, in which it will afford increased lift for low-speed flight, and a low incidence condition shown in FIGS. 1 and 2, in which it is adjusted for high speed flight. Said wing movements are effected under the pilot's control through the medium of a fluid-pressure jack 16, the cylinder of which is anchored at 101 to the fore part of the fuselage structure, whilst the ram is pivotally connected to the underside of the wing at 141.

It will be seen that when the lift engines 13 are in use, i.e. during take-off and landing, and the wing 14 is in the low-speed flight condition shown in FIGS. 3 and 4, the undersurface of the wing serves as a scoop directing the airstreams into the engine bay. When the aircraft attains sufficient speed to require a decreased wing incidence, the movement of the wing to the position shown in FIGS. 1 and 2 is effective to close the upper part of the engine bay 12 and the wing itself constitutes the closure.

Such an arrangement is advantageous, not only on account of the simplicity of the mechanical means by which the movement of the wing may be carried into effect, but also because it avoids any necessity for impairing the rigidity of the wing structure by providing in it apertures for the engine air-intake.

If desired, there may be attached to the underside of the wing two spaced shutter-like members 17, 17 which, when the wing is in the high-speed position, are housed within the side-walls of the engine bay 12, but which serve to encase the sides of the opening by which air is admitted to the engine bay when the lift engines are in use.

What I claim as my invention and desire to secure by Letters Patent is:

1. An aircraft incorporating in its fuselage or body one or more vertically disposed jet-lift engines and an engine bay having an opening at its top, said engines being housed in said bay, and a wing system which is capable of adjustment with respect to incidence in relation to the fuselage and which constitutes a closure for the engine bay opening.

2. An aircraft as claimed in claim 1, wherein a part of the wing serves as a scoop for diverting the airstream into the engine bay opening.

3. An aircraft as claimed in claim 1, wherein the underside of the wing has attached thereto transversely spaced shutters which in the high speed wing position are housed inside the walls of the engine bay, but which encase the sides of the apertures above the engine bay when the wing is raised to the low-speed position.

References Cited in the file of this patent

UNITED STATES PATENTS

| | | |
|---|---|---|
| 2,912,191 | Millam | Nov. 10, 1959 |
| 2,930,544 | Howell | May 29, 1960 |
| 2,945,642 | Nofi | July 19, 1960 |